Jan. 13, 1931.                J. G. UTZ                1,788,415
                      SPEED CHANGING MECHANISM
                       Original Filed June 27, 1925

Inventor
JOHN G. UTZ
By Jhing Harness
Attorney

Patented Jan. 13, 1931

1,788,415

UNITED STATES PATENT OFFICE

JOHN G. UTZ, OF DETROIT, MICHIGAN, ASSIGNOR TO THE WARFORD CORPORATION, OF NEW YORK, N. Y., A CORPORATION OF NEW YORK

SPEED-CHANGING MECHANISM

Original application filed June 27, 1925, Serial No. 39,953. Divided and this application filed January 11, 1926. Serial No. 80,444.

It is the primary object of my invention to provide a speed changing mechanism which is particularly adapted for use on Ford pleasure car automobiles and for that reason my invention is so arranged as to be particularly adapted for assembly and use with such automobiles.

Inasmuch as the expected greatest use for my invention is as an accessory for such automobiles, it is quite necessary that my device be so constructed as to facilitate its installation with as few alterations to the automobile as built by its manufacturer as is possible. It is furthermore desirable that the design be such that the device need not be disassembled in order to attach it to such an automobile.

The particular features and advantages of my invention will be more fully described in the body of the specification.

My invention, therefore, consists in the arrangement, combination and construction of the various parts of my improved device as described in the specification, claimed in my claims and shown in the accompanying drawings, in which:

Figure 1:
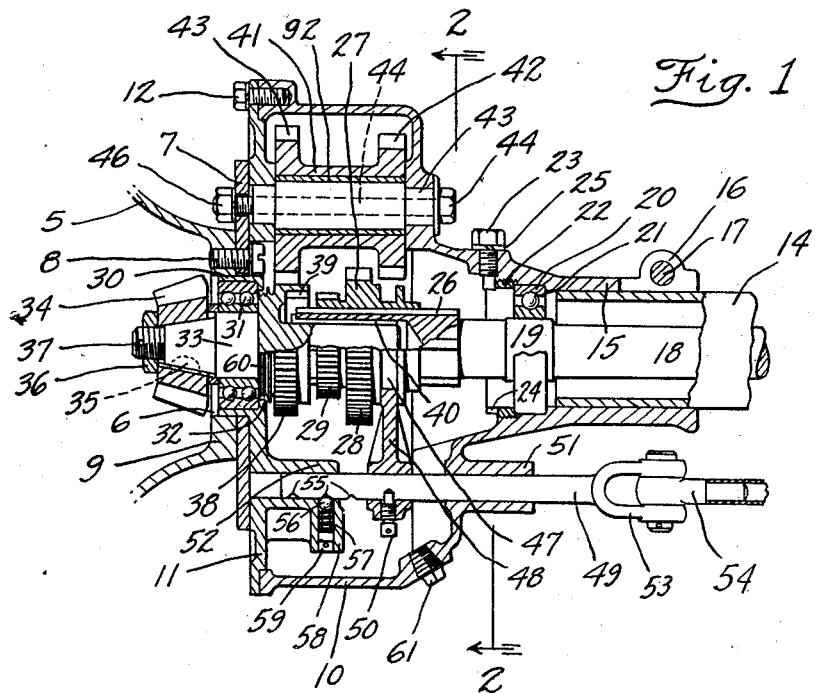
Fig. 1 is a sectional view taken on line 1—1 of Fig. 2 showing my improved device in assembled position.
Figure 2:
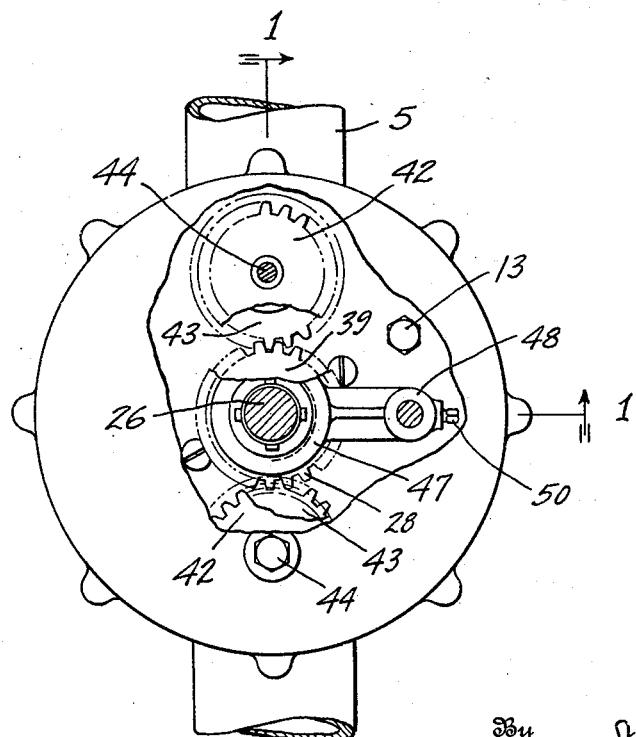
Fig. 2 is a view taken on line 2—2 of Fig. 1.

I have shown a conventional rear axle housing 5 which is provided with the conventional rear axle shafts and differential gearing (not shown).

The rear axle housing 5 is provided with a forward central opening 6 around which a plate 7 is secured by cap screws 8 extended into the flange 9 surrounding the opening 6, thus providing means for bolting the auxiliary transmission housing or casing to the rear axle housing. The plate 7 is centrally apertured, in alignment with the opening in the housing, such aperture being slightly larger than is the opening in the housing. The auxiliary transmission casing consists of the main casing 10 and a cover plate 11 secured together by studs 12. The cover plate 11 is secured to the plate 7 by means of bolts 13.

I have shown a conventional drive shaft tube or housing 14 fitting within the forward projection 15 of the casing 10. The projection 15 may be split at its forward end and provided with an apertured ear 16 on each side of the split, through which a bolt 17 may extend for clamping the portion 15 to the tube 14.

Extended through the tube 14 and continuing through the portion 15 into the casing 10 is a drive shaft 18 having a circular projection 19 thereon adapted to rotate in a ball bearing 20, which is positioned in the casing 10 by a bearing against a shoulder 21 at one side thereof and by a screw threaded ring 22 at the other side thereof, which said ring is held against displacement by a stud 23 extending through the top of the casing 10 and bearing against the notched edge 24 thereof. The stud 23 is held against accidental displacement by a lock washer 25.

The rearward end of the drive shaft 18 is provided with a plurality of splines 26, upon which a gear unit 27 consisting of a large gear 28 and a smaller gear or clutch 29, is adapted to slide.

The cover plate 11 of the transmission housing is provided with a circular rearwardly extending flange 30 fitted within the opening 6 of the rear axle housing to thus center the assembly. It will be noted that this flange is entirely free of the aperture in the plate 7.

A ball bearing 31 is provided within the flange 30, held against forward displacement by the circular flange 32. A stub shaft 33 is mounted for rotation in the bearing 31 and is tapered adjacent its rearward end.

A pinion 34 is provided on such tapered portion, being keyed thereto as at 35, and a nut 36 is screwed on the end of the shaft and held against displacement by a cotter pin 37. A gear member 38 is provided on the forward end of the stub shaft 33, such gear member having an internal gear or clutch teeth 39 adapted to engage with the clutch teeth 29. The stub shaft 33 terminates in a bushing 40 within the drive shaft 18.

Secured in the casing 10 are a pair of longitudinal gear units 41 consisting of gears 42 and 43. The gear units 41 are mounted for rotation upon bushings 92 provided upon the shafts 43. The shafts 43 are hollow and have bolts 44 passing through them and through the casing 10 at one end and the plates 11 and 7 at the other being secured in this position by nut 46. The gears 43 are so positioned as to be constantly in mesh with the gear 38.

Integral with the gear unit 27 is a groove 47 into which a shifting fork 48 passes. The shifting fork 48 is secured on its other end to a rod 49 by means of a set screw 50.

The rod 49 is positioned in the casing 10 by the apertured bosses 51 and 52 and is provided at its forward end with a clevice 53 engaging with the end of a rod 54 which extends to a point adjacent the driving seat of the vehicle and which may be actuated to slide the rod 49 fore and aft. A plurality of notches 55 are provided in the rod 49 so that as the rod 49 is shifted to its various hereinafter mentioned positions, one of the notches will engage with the ball 56. The ball 56 is resiliently mounted upon a coiled spring 57 provided in the apertured boss 58 and held against displacement by a plug 59.

It will be apparent that in the operation of my improved device rearward sliding of the rod 49 will move the gear unit 28 so that the teeth 29 will engage with the teeth 39 so as to form a clutching connection between the shafts 18 and 33 and drive the two shafts at the same speed and that forward sliding of the shaft 49 will disengage the teeth 29 and 39 and bring the teeth 28 into engagement with the teeth 42 so that rotation of the drive shaft 18 will be imparted through the gears 28 and 42 to the two gear units 41 and thence transmitted through the gears 43 and the gear 38 to the stub shaft 33 so as to drive the stub shaft at a higher, or lower, speed than the drive shaft 18.

It will be seen that the plate 7 is utilized entirely as an adapter for securing the transmission housing or casing in place and the central opening in the plate is entirely free of the flange 30 on the cover plate 11, so that the flange 30 and correspondingly the transmission housing or casing is entirely centered by the opening 6 in the axle housing. This is important for the reason that the opening 6 is correctly made for alignment of the shaft through which power is transmitted and for alignment of the pinion 34 with the differential gearing.

It will further appear that the drive shaft 18 may shift longitudinally in operation without affecting the remaining parts of the mechanism for the reason that the portion 19 constituting the connection between the shaft 18 and the bearing 20 is longer than the inner raceway of the bearing and for the further reason that the extreme rearward end of the shaft 18 has considerable clearance from the forward face of the gear member 38. This is important as permitting relative movement of the drive shaft under the impacts and strains of service without in any way interfering with the operation of the mechanism.

It will be noted also that grooves 60 are provided on the rearward end of the gear member 38 to prevent an undesirable amount of lubricant from passing out of the casing 10 into the axle housing, and at the same time permit sufficient lubricant to pass to insure correct lubrication of the bearing 31. A plug 61 is provided in the top of the casing 10 to permit filling of the casing with lubricant.

I desire it to be understood that the same results may be attained by the use of only a single gear unit 41 instead of two gear units, as I have shown them, with the exception that because of the limited space into which the device is placed it becomes necessary to narrow the width of the gear teeth so that in order to insure proper gear strength, I have deemed it advisable to utilize two sets of gears for transmitting power for the overdrive.

It will be understood by those skilled in the art that my improved device is maintained for use as an auxiliary speed changing mechanism in that a main speed changing mechanism is provided on the forward end of the drive shaft and that the particular adaptation and arrangement of parts as hereinbefore described have particular advantages and utility because of the particular construction with which my invention deals.

I have found further that this arrangement of gears on opposite sides of the drive or stub shafts tends for better operation in that the forces exerted by the two sets of gear units centralize toward the drive and stub shafts and do away with the tendency to push the drive and stub shafts from their normal centers.

This application is a division of my copending application, Serial No. 39,953, filed June 27th, 1925, which matured into Patent Number 1,578,486.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination with a rear axle housing, a driven shaft extending into said housing, a drive shaft axially aligned with and spaced from said driven shaft to allow relative axial movement therewith, said drive shaft having a member slidably mounted thereon, said member comprising a gear and clutching means, a member mounted on said driven shaft having external gear teeth and internal means adapted to be operatively associated with said clutching means, a counter-shaft having a pair of integral gears mounted thereon, one of which is adapted to mesh with the gear on said drive shaft member and the other of which is in constant mesh with the gear on the driven shaft, and a bearing unit adjacent said housing for said drive shaft permitting axial movement thereof in either direction.

2. In combination with a rear axle housing a driven shaft extending into said housing, a drive shaft axially aligned with and spaced from said driven shaft to allow relative axial movement therewith, said drive shaft having a member slidably mounted thereon, said member comprising a gear and clutching means, a gear member fixedly mounted on said driven shaft, means internal of said driven shaft member adapted to be associated with said clutching means, a pair of counter-shafts positioned diametrically on opposite sides of said driven shaft, each of said counter-shafts having a gear in mesh with the gear on said driven shaft, means for sliding said driving shaft member into a position for transmitting motion to said driven shaft, and a bearing unit adjacent said housing for said drive shaft permitting axial movement thereof in either direction.

JOHN G. UTZ.